United States Patent [19]

Khoury et al.

[11] Patent Number: 4,966,742

[45] Date of Patent: Oct. 30, 1990

[54] PREPARATION OF THIN CERAMIC SHEETS

[76] Inventors: Issam A. Khoury, 110 Marlboro Rd., Southboro, Mass. 01772; Robert H. Heistand, II, 10 Donnell Rd., Walpole, Mass. 02032; Iwao Kohatsu, 46 Reed St., Lexington, Mass. 02173

[21] Appl. No.: 767,451

[22] Filed: Aug. 20, 1985

[51] Int. Cl.$^5$ .............................................. C04B 33/28
[52] U.S. Cl. ...................................... 264/166; 264/63; 264/212; 264/216; 264/301
[58] Field of Search ................. 264/63, 166, 212, 216, 264/301

[56] References Cited

U.S. PATENT DOCUMENTS

| | | |
|---|---|---|
| 2,486,410 | 11/1949 | Howatt . |
| 3,231,328 | 1/1966 | Pechini et al. . |
| 3,330,697 | 7/1967 | Pechini . |
| 3,565,749 | 2/1971 | Wizon . |
| 3,780,150 | 12/1973 | Stetson et al. . |
| 4,094,690 | 6/1973 | Morton . |
| 4,148,940 | 4/1979 | Breininger et al. . |
| 4,209,477 | 6/1980 | Yanagida et al. . |
| 4,397,666 | 8/1983 | Mishima et al. . |
| 4,399,090 | 8/1983 | Sprangers et al. . |
| 4,447,853 | 5/1984 | Tomuro et al. . |

FOREIGN PATENT DOCUMENTS 125639 11/1984 European Pat. Off. .

OTHER PUBLICATIONS

Chemical Abstract 100:11529p.
Lockhart, R. J. et al., *Journal of the American Ceramic Society* 49, pp. 299–302 (1966).
Fukushima et al., Ceramic Bulletin, vol. 55, pp. 1064–1065 (1976).
Borgias, B. A. et al., *Inorganic Chem.*, vol. 23, pp. 1009–1016 (1984).
Rosenheim & Sorge, *Berichte*, V. 53, pp. 932-9 (1920) and Translation.
Funk et al., *J. Prakt. Chem.*, 4 Reihe, Bd. 3, 320–332 (1956).
"Tape Casting of Ceramics" in Ceramic Processing Before Firing edited by G. Onada, Jr. & L. Hench, J. Wiley & Sons, NY (1978).

*Primary Examiner*—James Derrington

[57] ABSTRACT

Thin, free-standing ceramic precursor tapes are prepared from solutions comprising certain coordination complexes, thus eliminating the use of ceramic powders. The precursor tapes can be calcined to form thin ceramic sheets useful in electronic applications.

20 Claims, No Drawings

PREPARATION OF THIN CERAMIC SHEETS

BACKGROUND OF THE INVENTION

The present invention relates to the preparation of thin, precursor ceramic tapes, and to the conversion of said tapes into thin ceramic sheets. The thin ceramic sheets of the present invention are useful in the preparation of multilayer capacitors and other electronic devices, such as multilayer substrates. A multilayer capacitor is a stack of several ceramic capacitor sheets connected in parallel to give a capacitor having high total capacitance. They can be small in size. For example, a typical multilayer capacitor size is 2 mm × 4 mm × 1 mm thick. Thus, these devices are ideal for microcircuitry. The manufacturers of multilayer capacitors desire to reduce the thickness of each individual ceramic sheet to approximately half of the 20 micron thickness which typically is used today. By doing so, the manufacturers could halve the number of ceramic sheets required for each capacitor, since capacitance is inversely proportional to the thickness of the ceramic sheets employed.

An additional advantage of reducing the number of ceramic sheets in each multilayer capacitor is that the number of layers of electrode is proportionally reduced. This would result in a large savings in material costs, as the electrodes consist of expensive noble metals.

In current commercial practice, multilayer capacitor manufacturing involves first dispersing ceramic dielectric powders consisting mainly of barium titanate and additives such as strontium titanate, lead titanate, calcium zirconate, lead oxide, borates, and silicates, into an organic solvent, such as methyl ethyl ketone/ethanol, by ball-milling the dispersed powder overnight. The resulting suspension of well-dispersed powders is then mixed with polymeric binders, plasticizers, and surfactants to form a slip. The slip is tape-cast onto a nonporous substrate, and is dried in an oven to produce a flexible sheet called a green tape. The green tape is screen-printed with a noble metal electrode. Forty to fifty layers of the printed tape are then laminated. The resulting laminate is diced into chips, and the organic binder is burned off. The resulting inorganic article is sintered at high temperatures typically ranging from about 1000° C. to 1300° C. to give a mechanically and electrically acceptable device.

The most common problem that multilayer capacitor manufacturers face is quality and consistency of ceramic powders. It is well-known that, in addition to high purity required for each ceramic compound, ceramic particles must be small in size, uniformly sized, and equiaxially shaped. In reality, ceramic powders typically are agglomerated when received, and even with lengthy ball-milling, slips still contain some large agglomerates. Accordingly, it would be desirable to have a process for the preparation of ceramic slips and free-standing precursor tapes which would eliminate ball-milling or other milling steps, and which would eliminate the need for ceramic powders and their accompanying quality problems.

SUMMARY OF THE INVENTION

The present invention is a powder-free process for the preparation of free-standing, thin, precursor tapes, the process comprising:
(a) preparing a solution comprising a coordination complex, a solvent, and a binder, the coordination complex comprising at least one metal selected from lead and the metals of Group IIA, at least one metal from Group IIIB, IVA, IVB, VB, VIB, VIIB or VIII, and an organic moiety having vicinal hydroxyl moieties, vicinal carboxylic acid moieties, or a hydroxyl moiety vicinal to a carboxylic acid moiety; the polymer and solvent being such that the viscosity of the solution is suitable for tape preparation; and
(b) preparing a free-standing precursor tape from the solution.

Surprisingly, the method of the present invention produces high purity, free-standing, thin, precursor tapes without using a ceramic powder. Other advantages of the process include the elimination of milling operations and solids processing.

DETAILED DESCRIPTION OF THE INVENTION

The process of the present invention advantageously can be used to prepare a free-standing precursor tape from a solution. The solution typically comprises a coordination complex, a solvent, and a binder. For the purposes of the present invention, the term "precursor" as used in "precursor tape" means a material which can be converted to a ceramic upon firing.

Coordination complexes desirably employed in the process of the present invention comprise at least one metal selected from lead and the metals of Group IIA, at least one metal from Group IIIB, IVA, IVB, VB, VIB, VIIB or VIII, and an organic moiety having active hydrogen atoms in close proximity. Examples of such organic moieties include, for example, those having vicinal hydroxyl moieties, vicinal carboxylic acid moieties, or radicals having a hydroxyl moiety vicinal to a carboxylic acid moiety. These organic moieties can be supplied from compounds such as, for example, compounds with vicinal hydroxyl moieties, such as catechol, pyrogallol, ascorbic acid, and naphthalene diol; compounds having vicinal carboxylic acid moieties, such as, phthalic acid and maleic acid; or compounds having a hydroxyl moiety vicinal to a carboxylic acid moiety, such as, for example, salicylic acid, and other alpha-hydroxy carboxylic acids, such as, lactic acid, alpha-hydroxy acetic acid, and the like. Aromatic organic moieties are preferred.

The coordination complexes employed in the present invention comprise at least two metals. At least one metal is selected from a first set comprising metals of Groups IIA and IVA and at at least one metal is selected from a second set of metals which are from Group IIIB, IVA, IVB, VB, VIB, VIIB or VIII. Barium, calcium, strontium and lead are the preferred metals from set one. Titanium, zirconium and tin are the preferred metals of set two. Examples of preferred coordination complexes include, for example, barium titanium catecholates, barium titanium salicylates, barium titanium lactates, barium zirconium catecholates, and the like, with the aromatic compounds being more preferred.

The coordination complexes are well-known. See, for example, Rosenheim and Sorge, *Berichte*, V. 53, pp. 932–9 (1920); and Funk et al., *J. Prakt. Chem.*, 4 Reihe, Bd. 3, 320–332 (1956).

The present invention advantageously employs a binder and a solvent. The binder serves to suspend and disperse solids and provides integrity and strength to the precursor tape. The solvent serves to disperse or solubilize the coordination complex. The solvent can be aqueous or organic, depending on the solubility of the complex employed. Examples of solvents include toluene, methanol and water, with water being preferred. Examples of water-insoluble binders include polymethylmethacrylate and polyvinylbutyral. For a water-based system, polymers such as methyl cellulose, hydroxypropyl ethyl cellulose, hydroxybutyl methyl cellulose, carboxymethyl cellulose, hydroxyethyl cellulose, water dispersions of ethyl cellulose, polyvinylalcohols, polyvinylpyrrolidones, poly(acrylic acid), polyacrylamide, polyethylene oxides or mixtures of the above polymers can be employed as binders in formulating the slip. Cellulose ethers are preferred binders. Examples of cellulose ethers include METHOCEL A, METHOCEL E, METHOCEL F, METHOCEL K, METHOCEL HB, and METHOCEL J5MS brand cellulose ethers, available from The Dow Chemical Company (METHOCEL is a trademark of The Dow Chemical Company).

A plasticizer is optionally employed. The plasticizer serves to lower the glass transition point of the binder to ambient or room temperature to increase the flexibility of the film, thereby making the precursor tape more suitable for lamination. Examples of typical plasticizers include dimethyl formamide, propylene glycol, dioctyl phthalate and the like.

In the preparation of the solution of the present invention, the following formulation typically is employed: from about 1 to about 40 weight parts of binder; from about 3 to about 70 weight parts of coordination complex; from about 30 to about 95 weight parts of solvent; and, optionally, from about 0.005 to about 10 weight parts of plasticizer. Preferred solutions comprise from about 1 to about 15 weight parts of binder, from about 3 to about 50 weight parts of coordination complex, from about 50 to about 90 weight parts of solvent, and, optionally, from about 0.01 to about 1 weight part of plasticizer. The components of the solution can be stirred at any combination of temperature, time, and stirring rate which is sufficient to give a homogeneous mixture of the different components. Preferably, the components are stirred for a period of at least one hour. Ambient temperature is preferred from the standpoint of convenience.

The homogeneous solution is converted to a flexible precursor tape using known methods such as curtain-coating, tape-casting or doctor-blading. It is preferred to tape-cast a single layer of the solution onto a nonporous substrate. The techniques for converting slips or solutions into flexible precursor tapes are well-known. For example, see the chapter "Tape-Casting of Ceramics" in Ceramic Processing Before Firing edited by G. Y. Onada, Jr. and L. L. Hench, John Wiley and Sons, Inc., N.Y. (1978), pp. 411-447. Note, however, that the process of the present invention does not require a ceramic powder. The precursor tapes of the present invention typically can be up to about 25 mils thick. Preferably, the thickness of the precursor tape is from about 0.2 to about 3 mils. More preferably, the thickness of the precursor tape is less than about 2 mils, and most preferably is less than about 1 mil.

The precursor tape prepared according to the process of the present invention can be converted using known methods into a thin ceramic sheet. Typically, the precursor tape is calcined to burn off the polymer and to convert the coordination complex to ceramic material which is sintered, or fired, at a temperature of from about 1000° C. to about 1400° C. Advantageously, the precursor tape of the present invention is less prone, by a factor of 2 to 4, to shrinkage upon drying than precursor tapes prepared using in situ formed organometallic polymers, such as those prepared in U.S. Pat. No. 3,330,697. Preferably, the fired ceramic sheets of the present invention range from about 3 to about 5 microns in thickness. Accordingly, they can be employed in the preparation of capacitors having reduced volume compared to the capacitors of the prior art.

SPECIFIC EMBODIMENTS

The following examples are given to illustrate the invention and should not be construed as limiting its scope. All parts and percentages are by weight unless otherwise indicated.

EXAMPLE 1

Hydroxypropyl methyl cellulose (2.1 g), available from The Dow Chemical Company under the name METHOCEL HB-100, having a viscosity of 125 cps at 20° C. as a 2 percent aqueous solution, is admixed with 67.9 g of water to prepare a 3 percent solution. To the solution is added 4.32 g (6.8 mmoles) of barium titanium triscatecholate with stirring until a homogeneous solution forms. The solution is centrifuged at 4° C. and 21,000 G (G represents a force unit equal to the gravity of the earth) for 20 minutes to eliminate foam. The resulting defoamed homogeneous solution is cast on plexiglass with a doctor blade gap set at 12.5 mils. The cast solution is air-dried to produce an orange, peelable sheet having a length of 8 feet, a width of 5 inches, and a thickness of 0.6 mils. The sheet is calcined at a temperature above 600° C. to produce a monolithic sheet of barium titanate ($BaTiO_3$). The equivalent weight of barium titanate in the film is 23.4 percent, calculated by dividing the weight of the calcined ceramic product by the weight of the precursor tape.

EXAMPLE 2

The procedure of Example 1 is repeated to produce an orange-colored precursor tape. The tape is cut into rectangular sections, and ten of the sections are laminated at 170° F. and 2000 psig. The laminate is calcined slowly and is sintered at temperatures above 1280° C. to produce monolithic barium titanate having a thickness of 35 microns.

EXAMPLE 3

The procedure of Example 1 is repeated with the following exceptions. The amount of coordination complex is 1.47 g (2.3 mmoles). The 3 percent polymer solution has a volume of 20 ml, and additionally contains 0.075 g (1.0 mmole) of dimethyl formamide. The doctor blade gap is 20 mils. The dried film is 1.5±0.1 mils thick, and contains 23.6 percent equivalent weight of barium titanate. It is observed that this film is more flexible than the film of Example 1.

EXAMPLE 4

A solution is prepared by dissolving 3.15 g (0.01 mole) of $Ba(OH)_2 \cdot 8H_2O$ in 50 ml of water. To the barium hydroxide solution is added 5.84 g (0.01 mole) of a 50 percent solution of lactic acid titanium chelate. The mixture is then filtered. The lactic acid titanium chelate is obtained from E. I. Du Pont de Nemours under the tradename Tyzor LA. The resulting milky white suspension is added to 25 ml of a 2 percent solution of Methocel J5MS, available from The Dow Chemical Company. The resulting mixture is stirred and is cast on a surface coated with polytetrafluoroethylene. The dried cast tape is uniform, colorless, translucent, flexible, and has a thickness of approximately 1 mil. Thermogravimetric analysis of the precursor tape to 1000° C. indicates 39.1 percent residue, which is confirmed to be barium titanate by X-ray diffraction analysis.

What is claimed is:

1. A process for the preparation of free-standing, thin, precursor ceramic tapes, the process comprising:
   (a) preparing a solution comprising a coordination complex, a solvent, and a binder, the coordination complex comprising at least one metal selected from lead and the metals of Group IIA, and at least one metal from Group IIIB, IVA, IVB, VB, VIB, VIIB or VIII, and an organic moiety having vicinal hydroxyl moieties, vicinal carboxylic acid moieties, or a hydroxyl moiety vicinal to a carboxylic acid moiety; the binder and solvent being such that the viscosity of the solution is suitable for tape preparation; and
   (b) preparing a free-standing precursor tape from the solution.

2. A process of claim 1 wherein the organic moiety is aromatic.

3. A process of claim 2 wherein the organic moiety is selected from the group consisting of catechol, naphthalene diol and salicylic acid.

4. A process of claim 3 wherein the binder is nonmetallic and nonsiliceous.

5. A process of claim 3 wherein the binder is a cellulose ether.

6. A process of claim 5 wherein the binder comprises methyl cellulose or a hydroxyalkyl alkyl cellulose.

7. A process of claim 6 wherein the binder is hydroxypropylethyl cellulose, hydroxybutylmethyl cellulose, or hydroxyethyl cellulose.

8. A process of claim 3 wherein the solvent comprises water.

9. A process of claim 3 wherein the solvent comprises an organic solvent.

10. A process of claim 2 wherein the organic moiety is catecholate.

11. A process of claim 2 wherein the organic moiety is salicylate.

12. A process of claim 2 wherein the organic moiety is based on naphthalene-1,2-diol.

13. A process of claim 2 wherein the organic moiety is based on naphthalene-2,3-diol.

14. A process of claim 2 wherein the organic moiety is based on naphthalene-1,8-diol.

15. A process of claim 2 wherein the organic moiety is derived from phthalic acid.

16. A process of claim 1 wherein the organic moiety is derived from ascorbic acid.

17. A process of claim 1 wherein the organic moiety is derived from lactic acid.

18. A process for the preparation of free-standing, precursor tapes having, a thickness of less than about 2 mils, the process comprising:
   (a) preparing a solution or suspension comprising from about 1 to about 40 weight parts of a binder, from about 3 to about 70 weight parts of a coordination complex, from about 30 to about 95 weight parts of a solvent, and, optionally, from about 0.005 to about 10 weight parts of a plasticizer; the coordination complex comprising at least one metal selected from lead and the metals of Group IIA, and at least one metal from Group IIIB, IVA, IVB, VB, VIB, VIIB, or VIII, and an organic moiety having vicinal hydroxyl moieties, vicinal carboxylic acid moities, or a hydroxyl moiety vicinal to a carboxylic acid moiety; and
   (b) preparing a free-standing precursor tape from the solution.

19. A process of claim 18 wherein the coordination complex comprises barium and titanium.

20. A process of claim 18 wherein the solution or suspension comprises from about 1 to about 15 weight parts of a binder, from about 3 to about 50 weight parts of a coordination complex, from about 50 to about 90 weight parts of a solvent, and, optionally, from about 0.01 to about 1 weight part of a plasticizer.

* * * * *